US010877861B2

(12) United States Patent
Hayes et al.

(10) Patent No.: US 10,877,861 B2
(45) Date of Patent: *Dec. 29, 2020

(54) REMOTE PROCEDURE CALL CACHE FOR DISTRIBUTED SYSTEM

(71) Applicant: Pure Storage, Inc., Mountain View, CA (US)

(72) Inventors: John Hayes, Mountain View, CA (US);
Robert Lee, San Carlos, CA (US);
Peter Vajgel, Menlo Park, CA (US);
Joshua Robinson, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 16/174,135

(22) Filed: Oct. 29, 2018

(65) Prior Publication Data
US 2019/0073282 A1 Mar. 7, 2019

Related U.S. Application Data

(63) Continuation of application No. 15/213,271, filed on Jul. 18, 2016, now Pat. No. 10,114,714, which is a
(Continued)

(51) Int. Cl.
*G06F 11/20* (2006.01)
*G06F 11/16* (2006.01)
(Continued)

(52) U.S. Cl.
CPC ...... *G06F 11/2069* (2013.01); *G06F 11/1451* (2013.01); *G06F 11/1469* (2013.01);
(Continued)

(58) Field of Classification Search
None
See application file for complete search history.

(56) References Cited

U.S. PATENT DOCUMENTS 5,390,327 A 2/1995 Lubbers et al.
5,479,653 A 12/1995 Jones
(Continued)

FOREIGN PATENT DOCUMENTS

EP 2164006 3/2010
EP 2256621 12/2010
(Continued)

OTHER PUBLICATIONS

Hwang, Kai, et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.
(Continued)

*Primary Examiner* — Yolanda L Wilson
(74) *Attorney, Agent, or Firm* — Womble Bond Dickinson (US) LLP

(57) ABSTRACT

A method of operating a remote procedure call cache in a storage cluster is provided. The method includes receiving a remote procedure call at a first storage node having solid-state memory and writing information, relating to the remote procedure call, to a remote procedure call cache of the first storage node. The method includes mirroring the remote procedure call cache of the first storage node in a mirrored remote procedure call cache of a second storage node. A plurality of storage nodes and a storage cluster are also provided.

20 Claims, 7 Drawing Sheets

Related U.S. Application Data continuation of application No. 14/697,571, filed on Apr. 27, 2015, now Pat. No. 9,396,078, which is a continuation of application No. 14/322,888, filed on Jul. 2, 2014, now Pat. No. 9,021,297.

(51) Int. Cl.

| | | |
|---|---|---|
| *G06F 11/14* | (2006.01) | |
| *G06F 12/02* | (2006.01) | |
| *G06F 12/0875* | (2016.01) | |
| *G06F 12/0813* | (2016.01) | |

(52) U.S. Cl.
CPC ...... *G06F 11/1666* (2013.01); *G06F 11/2056* (2013.01); *G06F 11/2058* (2013.01); *G06F 11/2089* (2013.01); *G06F 11/2097* (2013.01); *G06F 12/0246* (2013.01); *G06F 12/0813* (2013.01); *G06F 12/0875* (2013.01); *G06F 2201/805* (2013.01); *G06F 2201/84* (2013.01); *G06F 2212/1032* (2013.01); *G06F 2212/154* (2013.01); *G06F 2212/284* (2013.01); *G06F 2212/286* (2013.01); *G06F 2212/452* (2013.01); *G06F 2212/7208* (2013.01)

(56) References Cited

U.S. PATENT DOCUMENTS

| | | | |
|---|---|---|---|
| 5,649,093 | A | 7/1997 | Hanko et al. |
| 6,275,898 | B1 | 8/2001 | DeKoning |
| 6,535,417 | B2 | 3/2003 | Tsuda |
| 6,643,748 | B1 | 11/2003 | Wieland |
| 6,725,392 | B1 | 4/2004 | Frey et al. |
| 6,836,816 | B2 | 12/2004 | Kendall |
| 6,985,995 | B2 | 1/2006 | Holland et al. |
| 7,032,125 | B2 | 4/2006 | Holt et al. |
| 7,051,155 | B2 | 5/2006 | Talagala et al. |
| 7,065,617 | B2 | 6/2006 | Wang |
| 7,069,383 | B2 | 6/2006 | Yamamoto et al. |
| 7,076,606 | B2 | 7/2006 | Orsley |
| 7,107,480 | B1 | 9/2006 | Moshayedi et al. |
| 7,159,150 | B2 | 1/2007 | Kenchammana-Hosekote et al. |
| 7,162,575 | B2 | 1/2007 | Dalal et al. |
| 7,164,608 | B2 | 1/2007 | Lee |
| 7,334,156 | B2 | 2/2008 | Land et al. |
| 7,370,220 | B1 | 5/2008 | Nguyen et al. |
| 7,424,498 | B1 | 9/2008 | Patterson |
| 7,424,592 | B1 | 9/2008 | Karr |
| 7,444,532 | B2 | 10/2008 | Masuyama et al. |
| 7,480,658 | B2 | 1/2009 | Heinla et al. |
| 7,536,506 | B2 | 5/2009 | Ashmore et al. |
| 7,558,859 | B2 | 7/2009 | Kasiolas |
| 7,565,446 | B2 | 7/2009 | Talagala et al. |
| 7,613,947 | B1 | 11/2009 | Coatney |
| 7,681,104 | B1 | 3/2010 | Sim-Tang et al. |
| 7,681,105 | B1 | 3/2010 | Sim-Tang et al. |
| 7,730,258 | B1 | 6/2010 | Smith |
| 7,743,276 | B2 | 6/2010 | Jacobsen et al. |
| 7,757,038 | B2 | 7/2010 | Kitahara |
| 7,778,960 | B1 | 8/2010 | Chatterjee et al. |
| 7,814,272 | B2 | 10/2010 | Barrall et al. |
| 7,814,273 | B2 | 10/2010 | Barrall |
| 7,818,531 | B2 | 10/2010 | Barrall |
| 7,827,351 | B2 | 11/2010 | Suetsugu et al. |
| 7,827,439 | B2 | 11/2010 | Matthew et al. |
| 7,870,105 | B2 | 1/2011 | Arakawa et al. |
| 7,885,938 | B1 | 2/2011 | Greene et al. |
| 7,886,111 | B2 | 2/2011 | Klemm et al. |
| 7,908,448 | B1 | 3/2011 | Chatterjee et al. |
| 7,916,538 | B2 | 3/2011 | Jeon et al. |
| 7,941,697 | B2 | 5/2011 | Mathew et al. |
| 7,958,303 | B2 | 6/2011 | Shuster |
| 7,971,129 | B2 | 6/2011 | Watson |
| 7,991,822 | B2 | 8/2011 | Bish et al. |
| 8,010,485 | B1 | 8/2011 | Chatterjee et al. |
| 8,010,829 | B1 | 8/2011 | Chatterjee et al. |
| 8,020,047 | B2 | 9/2011 | Courtney |
| 8,046,548 | B1 | 10/2011 | Chatterjee et al. |
| 8,051,361 | B2 | 11/2011 | Sim-Tang et al. |
| 8,051,362 | B2 | 11/2011 | Li et al. |
| 8,082,393 | B2 | 12/2011 | Galloway et al. |
| 8,086,634 | B2 | 12/2011 | Mimatsu |
| 8,086,911 | B1 | 12/2011 | Taylor |
| 8,090,837 | B2 | 1/2012 | Shin et al. |
| 8,108,502 | B2 | 1/2012 | Tabbara et al. |
| 8,117,388 | B2 | 2/2012 | Jernigan, IV |
| 8,140,821 | B1 | 3/2012 | Raizen et al. |
| 8,145,838 | B1 * | 3/2012 | Miller ............... G06F 11/2023 711/114 |
| 8,145,840 | B2 | 3/2012 | Koul et al. |
| 8,176,360 | B2 | 5/2012 | Frost et al. |
| 8,180,855 | B2 | 5/2012 | Aiello et al. |
| 8,200,922 | B2 | 6/2012 | McKean et al. |
| 8,225,006 | B1 | 7/2012 | Karamcheti |
| 8,239,618 | B2 | 8/2012 | Kotzur et al. |
| 8,244,999 | B1 | 8/2012 | Chatterjee et al. |
| 8,305,811 | B2 | 11/2012 | Jeon |
| 8,315,999 | B2 | 11/2012 | Chatley et al. |
| 8,327,080 | B1 | 12/2012 | Der |
| 8,351,290 | B1 | 1/2013 | Huang et al. |
| 8,375,146 | B2 | 2/2013 | Sinclair |
| 8,397,016 | B2 | 3/2013 | Talagala et al. |
| 8,402,152 | B2 | 3/2013 | Duran |
| 8,412,880 | B2 | 4/2013 | Leibowitz et al. |
| 8,423,739 | B2 | 4/2013 | Ash et al. |
| 8,429,436 | B2 | 4/2013 | Filingim et al. |
| 8,473,778 | B2 | 6/2013 | Simitci |
| 8,479,037 | B1 | 7/2013 | Chatterjee et al. |
| 8,498,967 | B1 | 7/2013 | Chatterjee et al. |
| 8,522,073 | B2 | 8/2013 | Cohen |
| 8,533,527 | B2 | 9/2013 | Daikokuya et al. |
| 8,544,029 | B2 | 9/2013 | Bakke et al. |
| 8,589,625 | B2 | 11/2013 | Colgrove et al. |
| 8,595,455 | B2 | 11/2013 | Chatterjee et al. |
| 8,615,599 | B1 | 12/2013 | Takefman et al. |
| 8,627,136 | B2 | 1/2014 | Shankar et al. |
| 8,627,138 | B1 | 1/2014 | Clark |
| 8,660,131 | B2 | 2/2014 | Vermunt et al. |
| 8,661,218 | B1 | 2/2014 | Piszczek et al. |
| 8,700,875 | B1 | 4/2014 | Barron et al. |
| 8,706,694 | B2 | 4/2014 | Chatterjee et al. |
| 8,706,914 | B2 | 4/2014 | Duchesneau |
| 8,713,405 | B2 | 4/2014 | Healey et al. |
| 8,725,730 | B2 | 5/2014 | Keeton et al. |
| 8,756,387 | B2 | 6/2014 | Frost et al. |
| 8,762,793 | B2 | 6/2014 | Grube et al. |
| 8,775,858 | B2 | 7/2014 | Gower et al. |
| 8,775,868 | B2 | 7/2014 | Colgrove et al. |
| 8,788,913 | B1 | 7/2014 | Xin et al. |
| 8,799,746 | B2 | 8/2014 | Baker et al. |
| 8,819,311 | B2 | 8/2014 | Liao |
| 8,819,383 | B1 | 8/2014 | Jobanputra et al. |
| 8,824,261 | B1 | 9/2014 | Miller et al. |
| 8,843,700 | B1 | 9/2014 | Salessi et al. |
| 8,850,108 | B1 | 9/2014 | Hayes et al. |
| 8,850,288 | B1 | 9/2014 | Lazier et al. |
| 8,856,593 | B2 | 10/2014 | Eckhardt et al. |
| 8,856,619 | B1 | 10/2014 | Cypher |
| 8,862,847 | B2 | 10/2014 | Feng et al. |
| 8,862,928 | B2 | 10/2014 | Xavier et al. |
| 8,868,825 | B1 | 10/2014 | Hayes |
| 8,874,836 | B1 | 10/2014 | Hayes |
| 8,886,778 | B2 | 11/2014 | Nedved et al. |
| 8,898,383 | B2 | 11/2014 | Yamamoto et al. |
| 8,898,388 | B1 | 11/2014 | Kimmel |
| 8,904,231 | B2 | 12/2014 | Coatney et al. |
| 8,918,478 | B2 | 12/2014 | Ozzie et al. |
| 8,930,307 | B2 | 1/2015 | Colgrove et al. |
| 8,930,633 | B2 | 1/2015 | Amit et al. |
| 8,949,502 | B2 | 2/2015 | McKnight et al. |
| 8,959,110 | B2 | 2/2015 | Smith et al. |
| 8,977,597 | B2 | 3/2015 | Ganesh et al. |
| 9,003,144 | B1 | 4/2015 | Hayes et al. |
| 9,009,724 | B2 | 4/2015 | Gold et al. |

(56) References Cited

U.S. PATENT DOCUMENTS

| | | |
|---|---|---|
| 9,021,053 B2 | 4/2015 | Bernbo et al. |
| 9,021,215 B2 | 4/2015 | Meir et al. |
| 9,025,393 B2 | 5/2015 | Wu |
| 9,043,372 B2 | 5/2015 | Makkar et al. |
| 9,053,808 B2 | 6/2015 | Sprouse |
| 9,058,155 B2 | 6/2015 | Cepulis et al. |
| 9,116,819 B2 | 8/2015 | Cope et al. |
| 9,117,536 B2 | 8/2015 | Yoon |
| 9,122,401 B2 | 9/2015 | Zaltsman et al. |
| 9,134,908 B2 | 9/2015 | Horn et al. |
| 9,153,337 B2 | 10/2015 | Sutardja |
| 9,189,650 B2 | 11/2015 | Jaye et al. |
| 9,201,733 B2 | 12/2015 | Verma |
| 9,207,876 B2 | 12/2015 | Shu et al. |
| 9,251,066 B2 | 2/2016 | Colgrove et al. |
| 9,323,667 B2 | 4/2016 | Bennett |
| 9,323,681 B2 | 4/2016 | Apostolides et al. |
| 9,348,538 B2 | 5/2016 | Mallaiah et al. |
| 9,384,082 B1 | 7/2016 | Lee et al. |
| 9,390,019 B2 | 7/2016 | Patterson et al. |
| 9,405,478 B2 | 8/2016 | Koseki et al. |
| 9,432,541 B2 | 8/2016 | Ishida |
| 9,477,632 B2 | 10/2016 | Du |
| 9,552,299 B2 | 1/2017 | Stalzer |
| 9,818,478 B2 | 11/2017 | Chung |
| 9,829,066 B2 | 11/2017 | Thomas et al. |
| 2002/0144059 A1 | 10/2002 | Kendall |
| 2003/0105984 A1 | 6/2003 | Masuyama et al. |
| 2003/0110205 A1 | 6/2003 | Johnson |
| 2004/0161086 A1 | 8/2004 | Buntin et al. |
| 2005/0001652 A1 | 1/2005 | Malik et al. |
| 2005/0076228 A1 | 4/2005 | Davis et al. |
| 2005/0235132 A1 | 10/2005 | Karr et al. |
| 2005/0278460 A1* | 12/2005 | Shin ............... G06F 9/5011 710/1 |
| 2005/0283649 A1 | 12/2005 | Turner et al. |
| 2006/0015683 A1 | 1/2006 | Ashmore et al. |
| 2006/0114930 A1 | 6/2006 | Lucas et al. |
| 2006/0174157 A1 | 8/2006 | Barrall et al. |
| 2006/0248294 A1* | 11/2006 | Nedved ............. G06F 11/1464 711/162 |
| 2007/0079068 A1 | 4/2007 | Draggon |
| 2007/0214194 A1 | 9/2007 | Reuter |
| 2007/0214314 A1 | 9/2007 | Reuter |
| 2007/0234016 A1 | 10/2007 | Davis et al. |
| 2007/0268905 A1 | 11/2007 | Baker et al. |
| 2008/0080709 A1 | 4/2008 | Michtchenko et al. |
| 2008/0107274 A1 | 5/2008 | Worthy |
| 2008/0155191 A1 | 6/2008 | Anderson et al. |
| 2008/0295118 A1 | 11/2008 | Liao |
| 2009/0077208 A1 | 3/2009 | Nguyen et al. |
| 2009/0138654 A1 | 5/2009 | Sutardja |
| 2009/0216910 A1 | 8/2009 | Duchesneau |
| 2009/0216920 A1 | 8/2009 | Lauterbach et al. |
| 2010/0017444 A1 | 1/2010 | Chatterjee et al. |
| 2010/0042636 A1 | 2/2010 | Lu |
| 2010/0094806 A1* | 4/2010 | Apostolides ........ G06F 12/0815 707/637 |
| 2010/0115070 A1 | 5/2010 | Missimilly |
| 2010/0125695 A1 | 5/2010 | Wu et al. |
| 2010/0162076 A1 | 6/2010 | Sim-Tang et al. |
| 2010/0169707 A1 | 7/2010 | Mathew et al. |
| 2010/0174576 A1 | 7/2010 | Naylor |
| 2010/0268908 A1 | 10/2010 | Ouyang et al. |
| 2011/0040925 A1 | 2/2011 | Frost et al. |
| 2011/0060927 A1 | 3/2011 | Fillingim et al. |
| 2011/0119462 A1 | 5/2011 | Leach et al. |
| 2011/0219170 A1 | 9/2011 | Frost et al. |
| 2011/0238625 A1 | 9/2011 | Hamaguchi et al. |
| 2011/0264843 A1 | 10/2011 | Haines et al. |
| 2011/0302369 A1 | 12/2011 | Goto et al. |
| 2012/0011398 A1 | 1/2012 | Eckhardt et al. |
| 2012/0079318 A1 | 3/2012 | Colgrove et al. |
| 2012/0110249 A1 | 5/2012 | Jeong et al. |
| 2012/0131253 A1 | 5/2012 | McKnight |
| 2012/0158923 A1 | 6/2012 | Mohamed et al. |
| 2012/0191900 A1 | 7/2012 | Kunimatsu et al. |
| 2012/0198152 A1 | 8/2012 | Terry et al. |
| 2012/0198261 A1 | 8/2012 | Brown et al. |
| 2012/0209943 A1 | 8/2012 | Jung |
| 2012/0226934 A1 | 9/2012 | Rao |
| 2012/0246435 A1 | 9/2012 | Meir et al. |
| 2012/0260055 A1 | 10/2012 | Murase |
| 2012/0311557 A1 | 12/2012 | Resch |
| 2013/0022201 A1 | 1/2013 | Glew et al. |
| 2013/0036314 A1 | 2/2013 | Glew et al. |
| 2013/0042056 A1 | 2/2013 | Shats |
| 2013/0060884 A1 | 3/2013 | Bernbo et al. |
| 2013/0067188 A1 | 3/2013 | Mehra et al. |
| 2013/0073894 A1 | 3/2013 | Xavier et al. |
| 2013/0124776 A1 | 5/2013 | Hallak et al. |
| 2013/0132800 A1 | 5/2013 | Healy et al. |
| 2013/0151653 A1 | 6/2013 | Sawicki |
| 2013/0151771 A1 | 6/2013 | Tsukahara et al. |
| 2013/0173853 A1 | 7/2013 | Ungureanu et al. |
| 2013/0238554 A1 | 9/2013 | Yucel et al. |
| 2013/0339314 A1 | 12/2013 | Carpentier et al. |
| 2013/0339635 A1 | 12/2013 | Amit et al. |
| 2013/0339818 A1 | 12/2013 | Baker et al. |
| 2014/0040535 A1 | 2/2014 | Lee |
| 2014/0040702 A1 | 2/2014 | He et al. |
| 2014/0047263 A1* | 2/2014 | Coatney ............. G06F 11/2023 714/4.11 |
| 2014/0047269 A1 | 2/2014 | Kim |
| 2014/0063721 A1 | 3/2014 | Herman et al. |
| 2014/0064048 A1 | 3/2014 | Cohen et al. |
| 2014/0068224 A1 | 3/2014 | Fan et al. |
| 2014/0075252 A1 | 3/2014 | Luo et al. |
| 2014/0136880 A1 | 5/2014 | Shankar et al. |
| 2014/0181402 A1 | 6/2014 | White |
| 2014/0237164 A1 | 8/2014 | Le et al. |
| 2014/0279936 A1 | 9/2014 | Bernbo et al. |
| 2014/0280025 A1 | 9/2014 | Eidson et al. |
| 2014/0289588 A1 | 9/2014 | Nagadomi et al. |
| 2014/0380125 A1 | 12/2014 | Calder et al. |
| 2014/0380126 A1 | 12/2014 | Yekhanin et al. |
| 2015/0032720 A1 | 1/2015 | James |
| 2015/0039645 A1 | 2/2015 | Lewis |
| 2015/0039849 A1 | 2/2015 | Lewis |
| 2015/0089283 A1 | 3/2015 | Kermarrec et al. |
| 2015/0100746 A1 | 4/2015 | Rychlik |
| 2015/0134824 A1 | 5/2015 | Mickens |
| 2015/0153800 A1 | 6/2015 | Lucas et al. |
| 2015/0180714 A1 | 6/2015 | Chunn |
| 2015/0280959 A1 | 10/2015 | Vincent |

FOREIGN PATENT DOCUMENTS

| | | |
|---|---|---|
| WO | WO 02-13033 | 2/2002 |
| WO | WO 2008103569 | 8/2008 |
| WO | WO 2008157081 | 12/2008 |
| WO | WO 2013032825 | 7/2013 |

OTHER PUBLICATIONS

Schmid, Patrick: "RAID Scaling Charts, Part 3:4-128 kB Stripes Compared", Tom's Hardware, Nov. 27, 2007 (http://www.tomshardware.com/reviews/RAID-SCALING-CHARTS.1735-4.html), See pp. 1-2.

Storer, Mark W. et al., "Pergamum: Replacing Tape with Energy Efficient, Reliable, Disk-Based Archival Storage," Fast '08: 6th USENIX Conference on File and Storage Technologies, San Jose, CA, Feb. 26-29, 2008 pp. 1-16.

Ju-Kyeong Kim et al., "Data Access Frequency based Data Replication Method using Erasure Codes in Cloud Storage System", Journal of the Institute of Electronics and Information Engineers, Feb. 2014, vol. 51, No. 2, pp. 85-91.

International Search Report and the Written Opinion of the International Searching Authority, PCT/US2015/018169, dated May 15, 2015.

International Search Report and the Written Opinion of the International Searching Authority, PCT/US2015/034302, dated Sep. 11, 2015.

(56) References Cited

OTHER PUBLICATIONS

International Search Report and the Written Opinion of the International Searching Authority, PCT/US2015/039135, dated Sep. 18, 2015.
International Search Report and the Written Opinion of the International Searching Authority, PCT/US2015/039136, dated Sep. 23, 2015.
International Search Report, PCT/US2015/039142, dated Sep. 24, 2015.
International Search Report, PCT/US2015/034291, dated Sep. 30, 2015.
International Search Report and the Written Opinion of the International Searching Authority, PCT/US2015/039137, dated Oct. 1, 2015.
International Search Report, PCT/US2015/044370, dated Dec. 15, 2015.
International Search Report amd the Written Opinion of the International Searching Authority, PCT/US2016/031039, dated May 5, 2016.
International Search Report, PCT/US2016/014604, dated May 19, 2016.
International Search Report, PCT/US2016/014361, dated May 30, 2016.
International Search Report, PCT/US2016/014356, dated Jun. 28, 2016.
International Search Report, PCT/US2016/014357, dated Jun. 29, 2016.
International Seach Report and the Written Opinion of the International Searching Authority, PCT/US2016/016504, dated Jul. 6, 2016.
International Seach Report and the Written Opinion of the International Searching Authority, PCT/US2016/024391, dated Jul. 12, 2016.
International Seach Report and the Written Opinion of the International Searching Authority, PCT/US2016/026529, dated Jul. 19, 2016.
International Seach Report and the Written Opinion of the International Searching Authority, PCT/US2016/023485, dated Jul. 21, 2016.
International Seach Report and the Written Opinion of the International Searching Authority, PCT/US2016/033306, dated Aug. 19, 2016.
International Seach Report and the Written Opinion of the International Searching Authority, PCT/US2016/047808, dated Nov. 25, 2016.
Stalzer, Mark A., "FlashBlades: System Architecture and Applications," Proceedings of the 2nd Workshop on Architectures and Systems for Big Data, Association for Computing Machinery, New York, NY, 2012, pp. 10-14.
International Seach Report and the Written Opinion of the International Searching Authority, PCT/US2016/042147, dated Nov. 30, 2016.

* cited by examiner

REMOTE PROCEDURE CALL CACHE FOR DISTRIBUTED SYSTEM

BACKGROUND

Solid-state memory, such as flash, is currently in use in solid-state drives (SSD) to augment or replace conventional hard disk drives (HDD), writable CD (compact disk) or writable DVD (digital versatile disk) drives, collectively known as spinning media, and tape drives, for storage of large amounts of data. Flash and other solid-state memories have characteristics that differ from spinning media. Yet, many solid-state drives are designed to conform to hard disk drive standards for compatibility reasons, which makes it difficult to provide enhanced features or take advantage of unique aspects of flash and other solid-state memory. Solid-state drives, and other types of storage, may be vulnerable to corruption if a failure occurs during servicing of a remote procedure call (RPC).

It is within this context that the embodiments arise.

SUMMARY

In some embodiments, a method of operating a remote procedure call cache in a storage cluster is provided. The method includes receiving a remote procedure call at a first storage node having solid-state memory and writing information, relating to the remote procedure call, to a remote procedure call cache of the first storage node. The method includes mirroring the remote procedure call cache of the first storage node in a mirrored remote procedure call cache of a second storage node. A plurality of storage nodes and a storage cluster are also provided.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
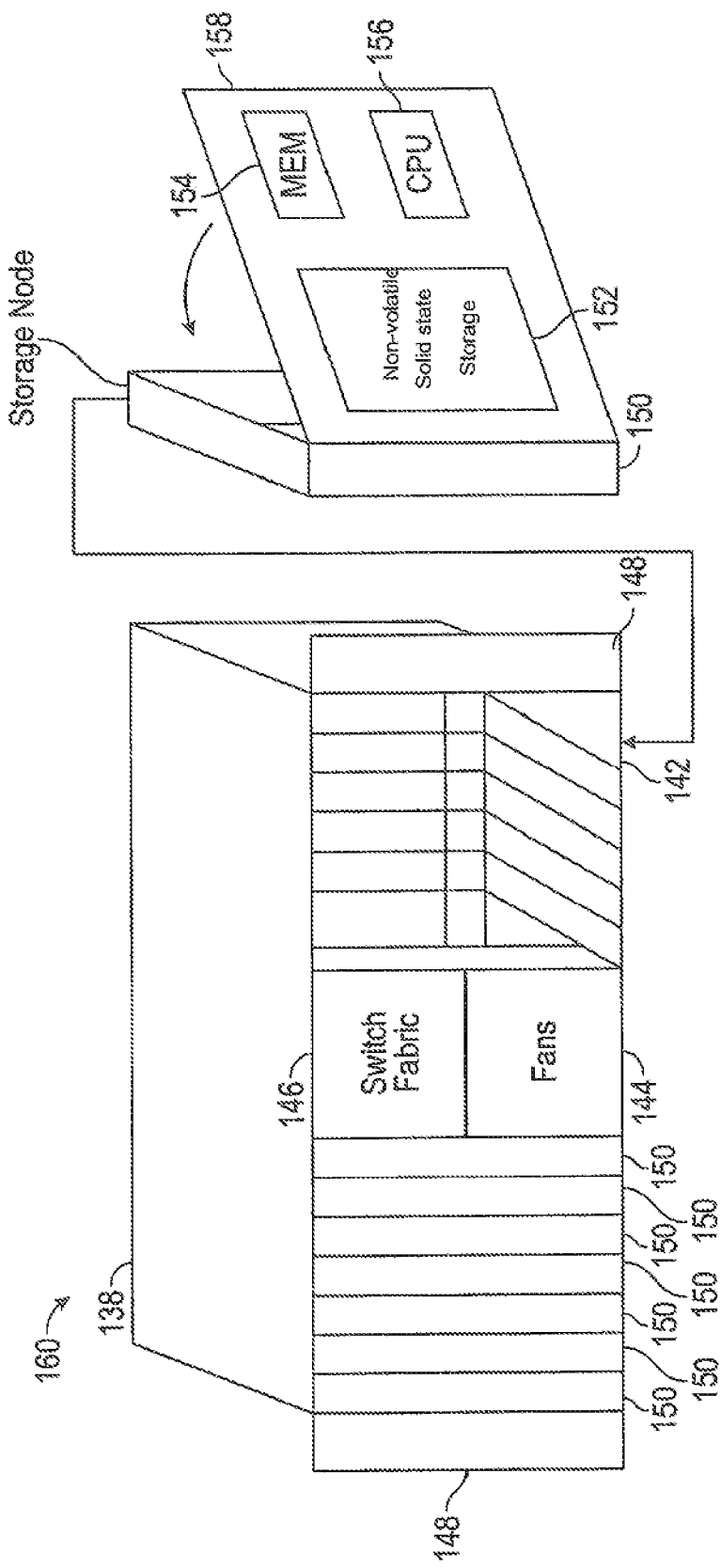
FIG. 1 is a perspective view of a storage cluster with multiple storage nodes and internal storage coupled to each storage node to provide network attached storage, in accordance with some embodiments.

The embodiments below describe a storage cluster that stores user data, such as user data originating from one or more user or client systems or other sources external to the storage cluster. The storage cluster distributes user data across storage nodes housed within a chassis, using erasure coding and redundant copies of metadata. Erasure coding refers to a method of data protection in which data is broken into fragments, expanded and encoded with redundant data pieces and stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster is contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid-state memory units, which may be referred to as storage units. One embodiment includes a single storage server in each storage node and between one to eight non-volatile solid-state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid-state memory units may directly access the internal communication bus interface through a storage node communication bus, or request the storage node to access the bus interface. The non-volatile solid-state memory unit contains an embedded central processing unit (CPU), solid-state storage controller, and a quantity of solid-state mass storage, e.g., between 2-32 terabytes (TB) in some embodiments. An embedded volatile storage medium, such as DRAM, and an energy reserve apparatus are included in the non-volatile solid-state memory unit. In some embodiments, the energy reserve apparatus is a capacitor, super-capacitor, or battery that enables transferring a subset of DRAM contents to a stable storage medium in the case of power loss. In some embodiments, the non-volatile solid-state memory unit is constructed with a storage class memory, such as phase change or magnetoresistive random access memory (MRAM) that substitutes for DRAM and enables a reduced power hold-up apparatus.

One of many features of the storage clusters, storage nodes and non-volatile solid-state storages disclosed herein is a redundant, fault-tolerant, distributed remote procedure call cache. This feature prevents corruption that can occur when a failure disrupts a remote procedure call in progress. By storing multiple copies of a remote procedure call cache across the storage nodes, a storage cluster is able to continue operating despite a failure causing disruption of a remote procedure call service, loss of contents of or access to a remote procedure call cache, or loss of other resource(s) involved in servicing the remote procedure call. A remote procedure call that is repeated (e.g., by a client or host system) is serviced only once internally to the storage cluster, but the result is returned each time the remote procedure call is repeated. Fault-tolerant support for multiple filesystems is hereby provided. These and further details of various storage systems and operation thereof are discussed below.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid-state storage 152 coupled to the CPU 156, although other mountings and/or components could be used in further embodiments. The memory 154 has instructions which are executed by the CPU 156 and/or data operated on by the CPU 156. As further explained below, the non-volatile solid-state storage 152 includes flash or, in further embodiments, other types of solid-state memory.

Storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid-state storage units 152 or storage nodes 150 within the chassis.

Figure 2:
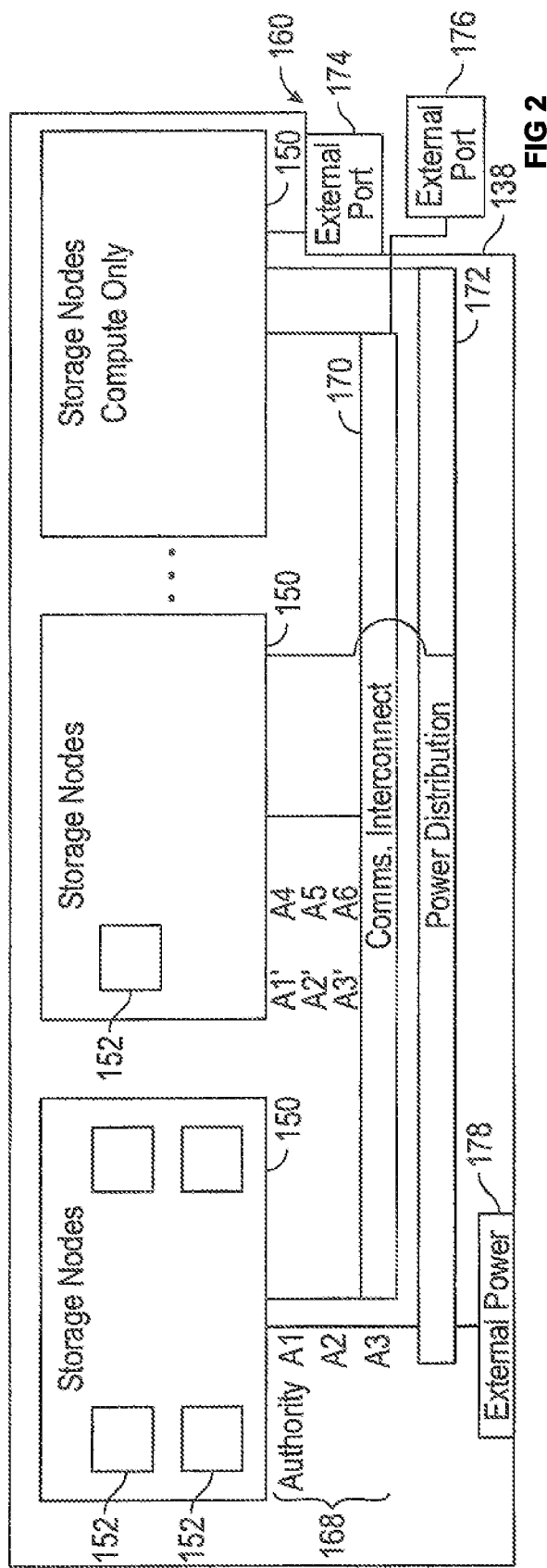
FIG. 2 is a block diagram showing a communications interconnect coupling multiple storage nodes in accordance with some embodiments.

FIG. 2 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 2, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid-state storage 152. In addition, one or more storage nodes 150 may be a compute only storage node. Authorities 168 are implemented on the non-volatile solid-state storages 152, for example as lists or other data structures stored in memory. In some embodiments the authorities are stored within the non-volatile solid-state storage 152 and supported by software executing on a controller or other processor of the non-volatile solid-state storage 152. In a further embodiment, authorities 168 are implemented on the storage nodes 150, for example as lists or other data structures stored in the memory 154 and supported by software executing on the CPU 156 of the storage node 150. Authorities 168, which can be viewed as roles that the storage nodes 150 take on, control how and where data is stored in the non-volatile solid-state storages 152 in some embodiments. This control assists in determining which type of erasure coding scheme is applied to the data, and which storage nodes 150 have which portions of the data. Each authority 168 may be assigned to a non-volatile solid-state storage 152. Each authority may control a range of inode numbers, segment numbers, or other data identifiers which are assigned to data by a file system, by the storage nodes 150, or by the non-volatile solid-state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid-state storage 152 in some embodiments. Each authority 168, covering a range of data segment numbers or other identifiers of the data, may be assigned to a specific non-volatile solid-state storage 152. In some embodiments the authorities 168 for all of such ranges are distributed over the non-volatile solid-state storages 152 of a storage cluster. Each storage node 150 has a network port that provides access to the non-volatile solid-state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid-state storage 152 and a local identifier into the set of non-volatile solid-state storage 152 that may contain data. In some embodiments, the local identifier is an offset into the device and may be reused sequentially by multiple segments. In other embodiments the local identifier is unique for a specific segment and never reused. The offsets in the non-volatile solid-state storage 152 are applied to locating data for writing to or reading from the non-volatile solid-state storage 152 (in the form of a RAID stripe). Data is striped across multiple units of non-volatile solid-state storage 152, which may include or be different from the non-volatile solid-state storage 152 having the authority 168 for a particular data segment.

If there is a change in where a particular segment of data is located, e.g., during a data move or a data reconstruction, the authority 168 for that data segment should be consulted, at that non-volatile solid-state storage 152 or storage node 150 having that authority 168. In order to locate a particular piece of data, embodiments calculate a hash value for a data segment or apply an inode number or a data segment number. The output of this operation points to a non-volatile solid-state storage 152 having the authority 168 for that particular piece of data. This non-volatile solid-state storage 152, as the authority owner for the data segment, can coordinate a move or reconstruction of the data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid-state storage 152, which may be done through an explicit mapping. The operation is repeatable, so that when the calculation is performed, the result of the calculation repeatably and reliably points to a particular non-volatile solid-state storage 152 having that authority 168. The operation may include the set of reachable storage nodes as input. If the set of reachable non-volatile solid-state storage units changes the optimal set changes. In some embodiments, the persisted value (i.e., the value that persistently results from the calculation) is the current assignment (which is always true) and the calculated value is the target assignment the cluster will attempt to reconfigure towards. This calculation may be used to determine the optimal non-volatile solid-state storage 152 for an authority in the presence of a set of non-volatile solid-state storage 152 that are reachable and constitute the same cluster. The calculation also determines an ordered set of peer non-volatile solid-state storages 152 that will also record the authority to non-volatile solid-state storage mapping so that the authority may be determined even if the assigned non-volatile solid-state storage is unreachable. A duplicate or substitute authority 168 may be consulted if a specific authority 168 is unavailable in some embodiments.

Two of the many tasks of the CPU 156 on a storage node 150 are to break up write data, and reassemble read data. When the system has determined that data is to be written, the authority 168 for that data is located as above. When the segment ID for data is determined, the request to write is forwarded to the non-volatile solid-state storage 152 currently determined to be the host of the authority 168 determined from the segment. The host CPU 156 of the storage node 150, on which the non-volatile solid-state storage 152 and corresponding authority 168 reside, then breaks up or shards the data and transmits the data out to various non-volatile solid-state storages 152. In some embodiments, the authority 168 for the data segment being written to may defer sharding and distributing data to be done asynchronously after establishing redundancy for that data itself. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid-state storage 152 and corresponding authority 168 reside requests the data from the non-volatile solid-state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid-state storage 152. In some embodiments, the segment host requests the data be sent to storage node 150 by requesting pages from storage and then sending the data to the storage node 150 making the original request. In some embodiments, a stripe width is only read if there is a single page read failure or delay.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain metadata, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid-state storage 152 coupled to the host CPUs 156 in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Modes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid-state storage 152 may be assigned a range of address space. Within this assigned range, the non-volatile solid-state storage 152 is able to allocate addresses without synchronization with other non-volatile solid-state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudorandomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid-state storage units that do not contain authorities. The communications interconnect between storage nodes and non-volatile solid-state storage units consists of multiple communication technologies and has non-uniform performance and fault tolerance characteristics. In some embodiments, as mentioned above, non-volatile solid-state storage units are connected to storage nodes via PCI express, storage nodes are connected together within a single chassis using an Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid-state storage unit to another non-volatile solid-state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid-state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being replicated. This allows the system to continue to serve client requests despite failures and component replacement. Although many hardware components contain unique identifiers that are visible to system administrators, manufacturers, hardware supply chains and ongoing monitoring quality control infrastructure, applications running on top of the infrastructure can address virtualized addresses. These virtualized addresses do not change over the lifetime of the storage system, regardless of component failures and replacements. This allows each component of the storage system to be replaced over time without reconfiguration or disruptions of client request processing.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

In addition to component redundancy in the communication channel, storage cluster 160 is configured to allow for the loss of one or more storage nodes 150. In some embodiments this cluster redundancy level may be one for relatively small storage clusters 160 (less than 8 storage nodes 150) and two for relatively larger storage clusters 160 (8 or more storage nodes 150) although any number would be suitable for the cluster redundancy level. In some embodiments, where more storage nodes 150 than the redundancy level are lost, the storage cluster 160 cannot guarantee availability of data or integrity of future updates. As mentioned above, data redundancy is implemented via segments. A segment is formed by selecting equal sized shards from a subset of the non-volatile solid-state storage 152, each within a different storage node 150. Shards are reserved to establish the redundancy level, e.g., one or two, and then a remainder constitutes the data (the data shards). The shards are encoded using an ECC scheme such as parity or Reed-Soloman (RAID 6), so that any subset of the shards equal in count to the data shards may be used to reconstruct the complete data. The storage cluster redundancy represents a minimum level of redundancy and it may be exceeded for any individual data element. Segments are stored as a set of non-volatile solid-state storage units, roles (data position or parity) and allocation unit local to each non-volatile solid-state storage unit. The allocation units may be a physical address or an indirection determined within the non-volatile solid-state storage 152. Each shard may be portioned into pages and each page into code words. In some embodiments, the pages are between about 4 kilobytes (kB) and 64 kB, e.g., 16 kB, while the code words are between about 512 bytes to 4 kB, e.g., 1 kB. These sizes are one example and not meant to be limiting as any suitable size for the code words and the pages may be utilized. The code words contain local error correction and a checksum to verify the error correction was successful. This checksum is "salted" with the logical address of the contents meaning that a failure to match the checksum may occur if the data is uncorrectable or misplaced. In some embodiments, when a code word fails a checksum it is converted to an "erasure" for purpose of the error correction algorithm so that the code word may be rebuilt.

Figure 3:
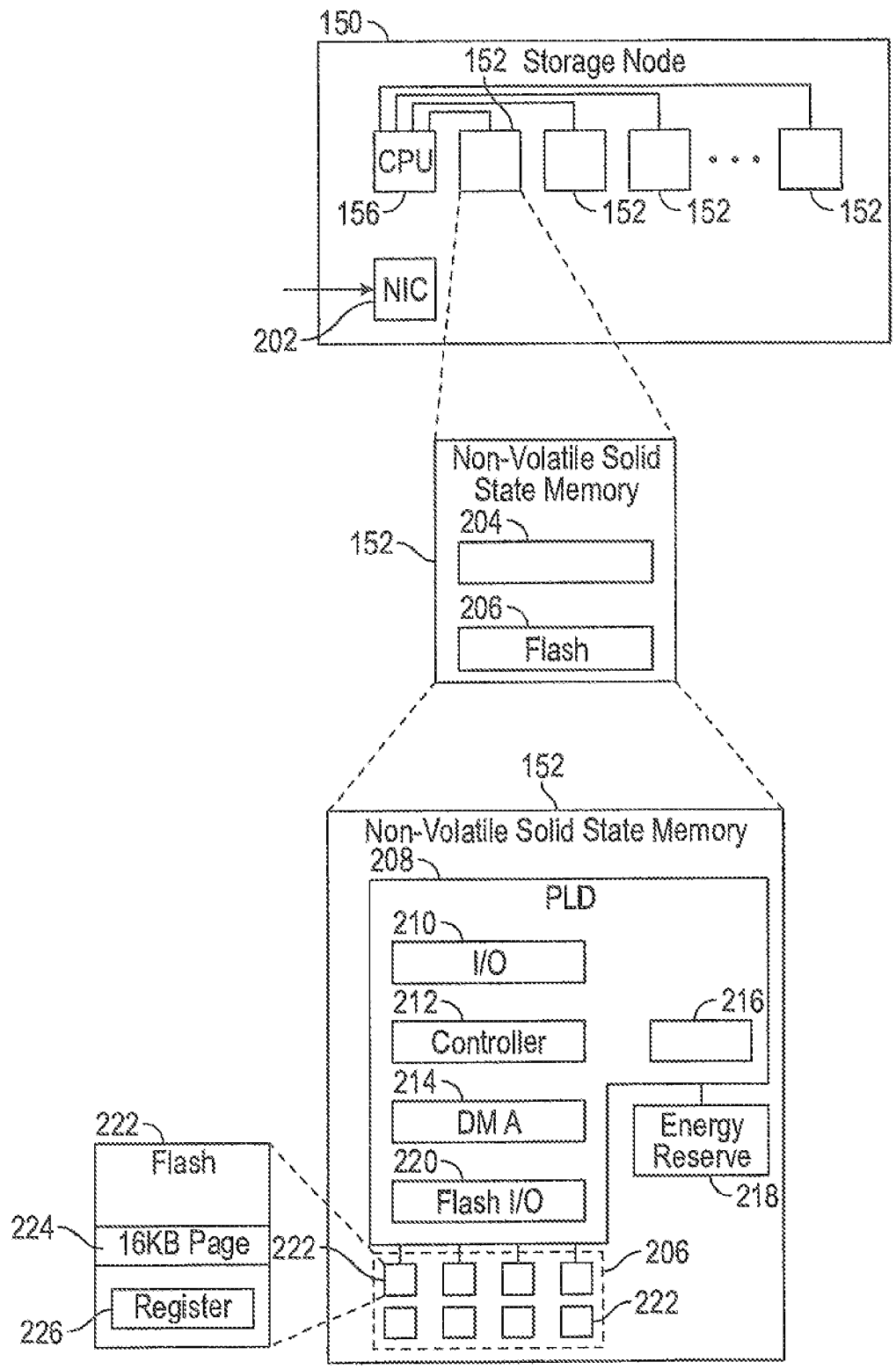
FIG. 3 is a multiple level block diagram, showing contents of a storage node and contents of one of the non-volatile solid-state storage units in accordance with some embodiments.

FIG. 3 is a multiple level block diagram, showing contents of a storage node 150 and contents of a non-volatile solid-state storage 152 of the storage node 150. Data is communicated to and from the storage node 150 by a network interface controller (NIC) 202 in some embodiments. Each storage node 150 has a CPU 156, and one or more non-volatile solid-state storage 152, as discussed above. Moving down one level in FIG. 3, each non-volatile solid-state storage 152 has a relatively fast non-volatile solid-state memory, such as non-volatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 3, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid-state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Figure 4:
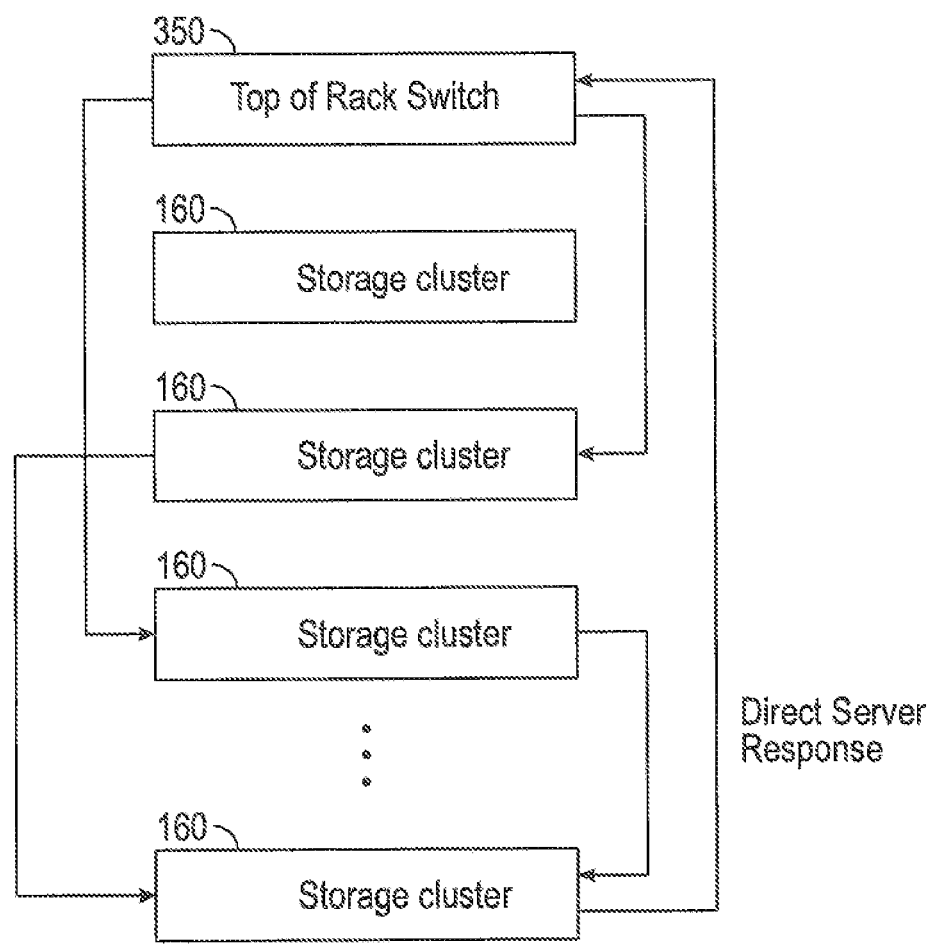
FIG. 4 is a block diagram showing remote procedure calls in a storage system in accordance with some embodiments.

FIG. 4 is a block diagram showing remote procedure calls in a storage system in accordance with some embodiments. A remote procedure call can be initiated by a client, and executed on one of the storage nodes in the storage system. Some embodiments of the storage nodes 150 have redundant remote procedure call caches which offer fault tolerance that protects the system against loss of a remote procedure call in event of a failure. Some embodiments of the storage nodes 150 support multiple filesystems contemporaneously. Combining embodiments of the storage nodes 150 with redundant remote procedure call caches and the support for multiple filesystems offers fault-tolerant operation under multiple filesystems. It should be appreciated that a remote procedure call refers to a technology that allows a computer program to cause a subroutine or procedure to execute in another address space, commonly on another computing device on a shared network, without a programmer explicitly coding the details for this remote interaction in some embodiments.

The storage system depicted in FIG. 4, and variations thereof, supports multiple interfaces, which can be file or object-oriented interfaces including, for example, NFS 3 (network file system three), NFS 4 (network file system four), CIFS (common Internet file system), Object API (object application programming interface), and iSCSI (Internet small computer system interface). In a cluster environment, each object has operatives, which could be based on the inode level, which represents a file or an object with an operative. Most filesystems are hierarchical, with directories and name spaces, and filenames within directories. Each filename is represented internally with an inode number.

In contrast with embodiments employing flash memory or other solid-state memory, spinning media such as hard disks, optical disks and floppy disks tend to cluster data sequentially or close together on the disk, which allows for rapid retrieval or retrieval in parallel. Directories and inodes are often placed close together. Adding fields to data or metadata tends to be difficult, and so is typically not done. With flash or other solid-state memory, there is no such requirement. With spinning media, to upgrade to change a storage scheme per a new filesystem, the data is typically offloaded and then reloaded back onto the system under the schema of the new filesystem. With flash or other solid-state memory on present embodiments, new data can be stored using a new scheme, without having to offload old data and rewrite the old data back on. Old data can remain under the old filesystem. For example, in present embodiments of a storage system, an inode version two and an inode version three can coexist in memory, with support for both. As a further example, files under both versions could not only be maintained but could also remain online during a conversion, for example from files under version two to version three. A storage cluster 160, having a group of storage nodes 150, can serve as a store for multiple filesystems. This contrasts with traditional storage, where a filesystem would be dedicated to a specified set of storage nodes or servers. In some embodiments of the storage system, the entire storage cluster 160 is available for storage to each filesystem, or a subset of the entire storage cluster 160, i.e., a specified set of storage nodes 150 could be dedicated to a specified filesystem.

As an example of how two (or more) differing inode versions, corresponding to two different filesystems, could coexist in an embodiment of the storage system, a top of rack switch 350 could route remote procedure calls according to inode version. The storage system depicted in FIG. 4 includes a top of rack switch 350 and multiple storage clusters 160, each having one or more storage nodes 150. For example, the access from outside of the storage system is through a network such as ethernet, which connects to the top of rack switch 350. In one embodiment, the top of rack switch 350 can determine where the authority is located for a given inode number, and send the request for access (e.g., the remote procedure call) to that non-volatile solid-state storage 152 (and corresponding storage node 150) having that authority. This could be accomplished through remote procedure call message parsing, and use of a table such as a lookup table or a hash table. A remote procedure call has data encoded in a specified format, and the top of rack switch 350 determines the inode number according to the message parsing, and sends the remote procedure call to the authority responsible for that inode number. In an embodiment of the top of rack switch 350 that lacks this capability, the top of rack switch could send the remote procedure call message down to one of the storage clusters 160, i.e., to one of the storage nodes 150 and accompanying non-volatile solid-state storage 152. The storage node 150 or non-volatile solid-state storage 152 would then determine which non-volatile solid-state storage 152 has the authority, and forward the remote procedure call message to that non-volatile solid-state storage 152. In FIG. 4 the arrow from the top of rack switch 350 to one of the storage clusters 160, and another arrow from that storage cluster 160 to the bottom-most storage cluster 160 illustrates this forwarding of remote procedure call messages. In case a storage node or non-volatile solid-state storage unit is unreachable, the storage nodes 150 or non-volatile solid-state storages 152 could determine a replacement authority and forward the remote procedure call message to that non-volatile solid-state storage 152. This operation is depicted in FIG. 4 by another arrow from the top of rack switch 350 to one of the storage clusters 160, and an arrow from that storage cluster 160 to the bottom-most storage cluster 160. Whichever authority finally handles data (whether a write or a read, etc.) returns the reply as a direct server response (DSR) in some embodiments, depicted as an arrow from the bottommost storage cluster 160 to the top of rack switch 350. Some embodiments do not perform a DSR, and may instead forward responses through one or more storage nodes 150. In further embodiments, other types of switches, or other locations for a switch are readily devised.

As a further example of how two or more differing inode versions, corresponding to two or more different filesystems, could coexist in an embodiment of the storage system, various Internet Protocol address handling schemes may be utilized. Files with one inode version, corresponding to one filesystem, could be sent to and read from one Internet Protocol address, and files with another inode version, corresponding to another filesystem, could be sent to and read from another Internet Protocol address. Internet Protocol address handling could be performed according to numerous mechanisms, some of which are summarized below.

As a first mechanism for Internet Protocol address handling, one Internet Protocol address could be used for the entire cluster, and the top of rack switch 350 could look in each packet and determine, from information in the header, an inode version. From the inode version, the top of rack switch 350 could apply a hash calculation, range-based assignment table, or a lookup table, and determine which storage node 150 handles that data. The top of rack switch 350 could then send the remote procedure call to the storage node 150 having the authority for that data, eliminating the need for forwarding the remote procedure call from one storage node 150 to another storage node 150. As a second mechanism for Internet Protocol address handling, the remote procedure call could be sent randomly to one of the storage nodes 150. That storage node 150 could then determine which storage node 150 has authority for the data, according to the inode number. The storage node 150 could then forward the remote procedure call accordingly. As a third mechanism for Internet Protocol address handling, differing Internet Protocol addresses could be used with one storage cluster 160, one group of storage clusters 160, or one portion of a storage cluster 160 handling one Internet Protocol address or several Internet Protocol addresses. Another storage cluster 160, group of storage clusters 160 or portion of a storage cluster 160 handling another Internet Protocol address or several Internet Protocol addresses. Files under one filesystem could have one address, and files under another filesystem could have another address.

In the above scenarios, the client could be operating over Internet Protocol, which may or may not be reliable. As an example, the client may retransmit a remote procedure call, but, meanwhile, the filesystem might have actually responded, which can lead to inconsistency (e.g. due to multiple executions of the same remote procedure call). A measure of fault tolerance, employing redundant remote procedure call caches can mitigate these potential problems, as described below.

Figure 5:
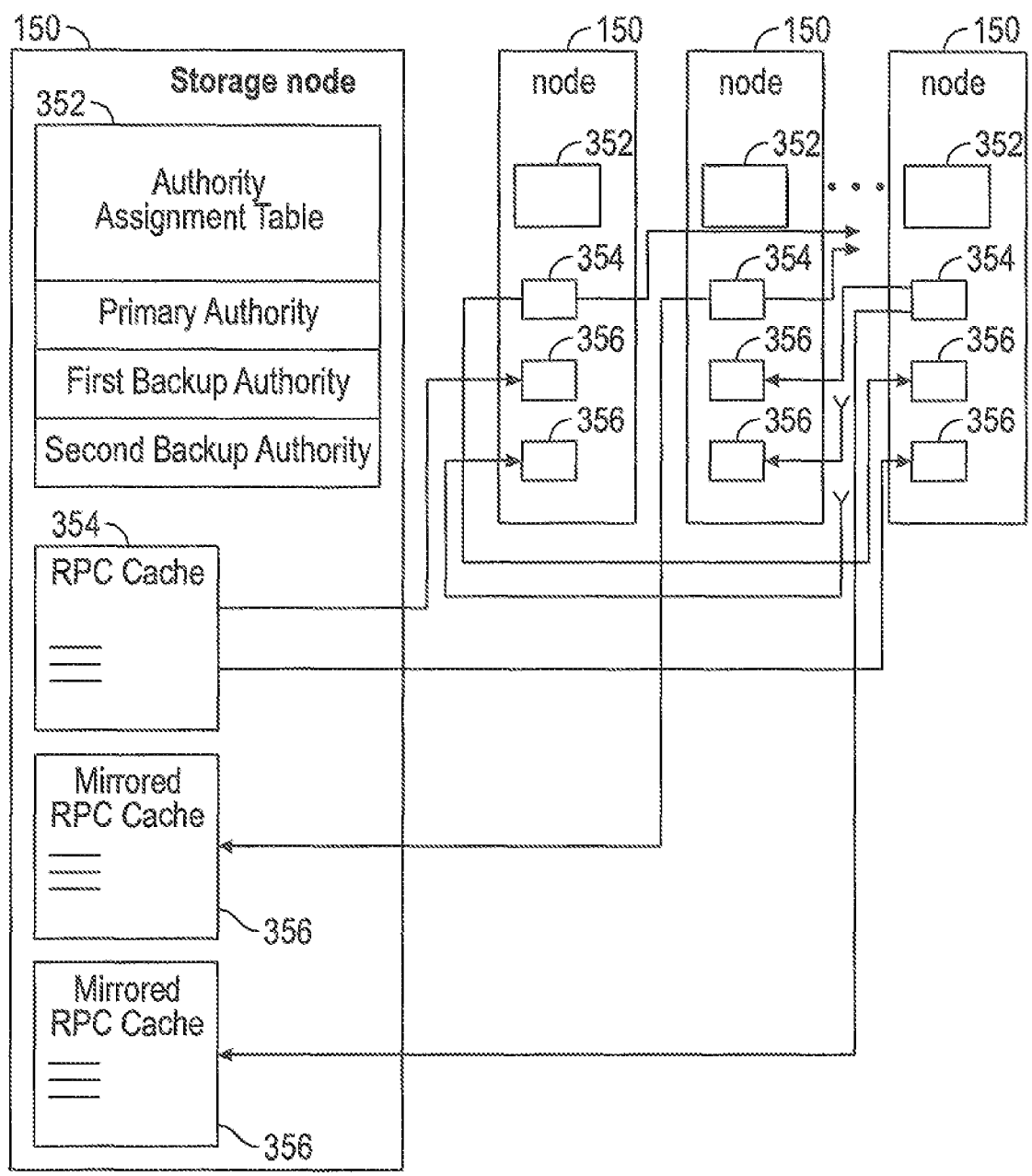
FIG. 5 is a block diagram of storage nodes with redundant remote procedure call caches in accordance with some embodiments.

FIG. 5 is a block diagram of storage nodes 150 with redundant remote procedure call caches 354, 356 in accordance with some embodiments. Each storage node 150 has an authority assignment table 352, a remote procedure call cache 354, and one or more mirrored remote procedure call caches 356. The remote procedure call cache 354 is located where the authority is located in order to minimize risk of breakage in a communication path between the location of the authority and the location of the remote procedure call cache 354 in some embodiments. Locating the remote procedure call cache 354 distal to the authority is possible but may increase delays and increase risk of such breakage of a communication path.

In various embodiments, the remote procedure call cache 354 and mirrored remote procedure call cache 356 are implemented in the memory 154 coupled to the CPU 156 of a storage node 150 (see FIG. 1) or in the non-volatile random access memory 204 of the non-volatile solid-state storage 152 (see FIG. 3). In other embodiments, the remote procedure call cache 354 and mirrored remote procedure call cache 356 are implemented in the dynamic random access memory 216 coupled to the controller 212 in the non-volatile solid-state storage 152, in the flash 206 in the non-volatile solid-state storage 152, or in flash memory on a storage node 150. In one embodiment, the remote procedure call cache 354 and one or more mirrored remote procedure call caches 356 are implemented as metadata 230 in the non-volatile random access memory 204 of the non-volatile solid-state storage 152. In operation, a storage node 150 mirrors the remote procedure call cache 354 in at least one other storage node 150 of the storage cluster.

When a remote procedure call arrives for servicing, the storage node 150 or the non-volatile solid-state storage 152 determines whether the remote procedure call has already been serviced. This can be accomplished by checking the remote procedure call cache 354 to see if a result is already posted, i.e., the result of servicing the remote procedure call is available. For example, the result could be an acknowledgment that a data write or update to a directory structure has taken place, or the result could be error corrected data from a data read. If a result has been posted, the result is returned as a response to the remote procedure call, but the servicing internal to the storage node 150 or the non-volatile solid-state storage 152 is not repeated. In this manner, a repeated remote procedure call can be answered without causing inconsistency in the storage node 150 and/or non-volatile solid-state storage 152.

In a case where the remote procedure call cache 354 is unreachable, one or more of the remaining storage nodes 150 or non-volatile solid-state storages 152 locates the corresponding mirrored remote procedure call cache 356 and determines whether a result of servicing the remote procedure call is already posted. This scenario could occur, for example, if the non-volatile solid-state storage 152 or the storage node 150 having the remote procedure call cache 354 is unresponsive or otherwise unreachable. The result, if available from the mirrored remote procedure call cache 356, is then returned as above. If there is no result, from either the remote procedure call cache 354 or the mirrored remote procedure call cache 356 as appropriate, the remote procedure call is serviced and responded to with the result of that service.

In one embodiment, each storage node 150 mirrors the remote procedure call cache 354 in two other storage nodes 150, as depicted in FIG. 5. For example, the leftmost storage node 150 could send a copy of the contents of the remote procedure call cache 354 to two other storage nodes 150. Each of these other storage nodes 150 would place the copied contents of the remote procedure call cache 354 in a mirrored remote procedure call cache 356 of that storage node 150 as depicted by the arrows in FIG. 5. Each remote procedure call message has a unique transaction identifier, signed by the client, uniquely identifying the transaction. If a storage node 150 is unreachable (whether permanently or temporarily), a copy of the remote procedure call cache 354 is available in at least one other storage node 150, e.g., in a mirrored remote procedure call cache 356. Each remote procedure call cache 354, and mirrored remote procedure call cache 356, contains the transaction identifier, the client identifier, and the result (e.g., an indication of whether or not the action is complete), in one embodiment. The remote procedure call, and information relating thereto as stored in the remote procedure call cache 354, are forms of metadata in some embodiments.

In one embodiment, each storage node 150 consults the table 352 resident in that storage node 150. For example, table 352 could reside in the memory of the storage node 150, or the memory of a non-volatile solid-state storage 152 of the storage node 150, and so on. The remote procedure call cache 354 is maintained for an authority for which that storage node 150 has primary authority, as indicated in table 352. The storage node 150 mirrors the remote procedure call cache 354, by sending updates (copies) of the contents of the remote procedure call cache 354 to the storage node 150 identified as having the first backup authority, and to the storage node 150 identified as having the second backup authority, according to the table 352. In further embodiments, additional copies of the remote procedure call cache 354 could be mirrored, or the copies and mirror caches could be distributed in a different manner. Locations of the mirrored remote procedure call caches 356 could be tracked by another table or tracking mechanism instead of table 352 in other embodiments.

In a scenario where a mirrored remote procedure call cache 356 belonging to a non-volatile solid-state storage 152 or a storage node 150 is unreachable (e.g., if the solid-state storage 152 or non-volatile storage node 150 itself is unreachable), the remaining storage nodes 150 can determine and assign a replacement mirrored remote procedure call cache 356. The determination and assignment of a replacement mirrored remote procedure call cache 356 may include applying one or more mechanisms, such as witnessing, voting, volunteering, consulting the table 352 to find a backup authority and assigning the mirrored remote procedure call cache 356 to the same node as has the backup authority, and so on. Or, a mirrored remote procedure call cache 356 could be assigned to a differing node than the node having the backup authority. Once the replacement mirrored remote procedure call cache 356 is determined, the storage node 150 corresponding to that replacement mirrored remote procedure call cache 356 can mirror the remote procedure call cache 354 to the mirrored remote procedure call cache 356. This would be followed by servicing the remote procedure call, and responding to the remote procedure call with a result. In some embodiments, remote procedure call entries to the remote procedure call cache 354 and/or the mirrored remote procedure call cache(s) 356 are deleted after a time expires. This can be accomplished using one or more timers, or timestamps, etc.

Figure 6:
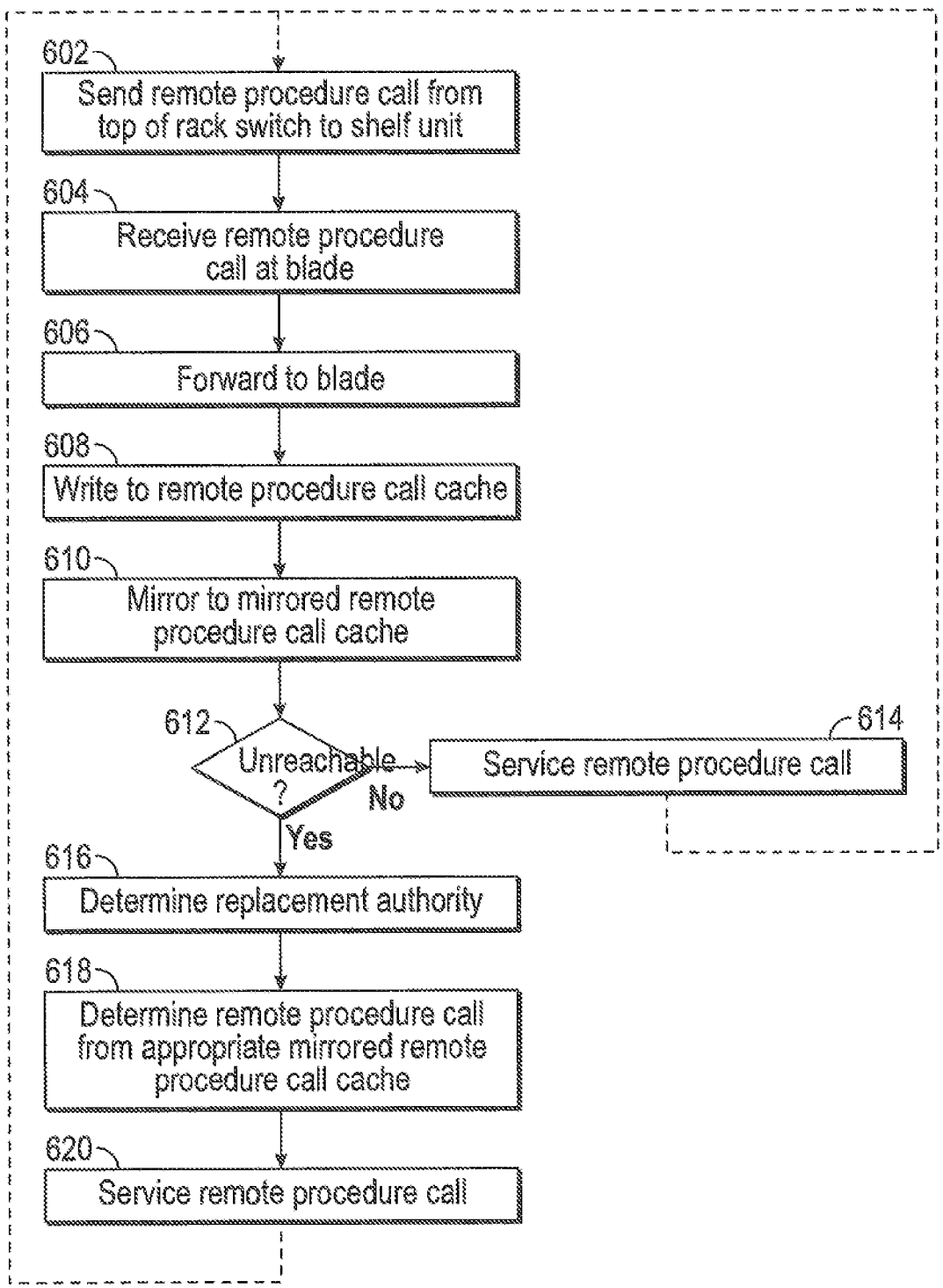
FIG. 6 is a flow diagram of a method for caching a remote procedure call in a storage cluster, which can be practiced on or by embodiments of the storage cluster, storage nodes and/or solid-state storages disclosed herein in accordance with some embodiments.

FIG. 6 is a flow diagram of a method for caching a remote procedure call in a storage cluster, which can be practiced on or by embodiments of the storage cluster, storage nodes and/or non-volatile solid-state storages disclosed herein. Many of the actions described in the method can be performed by one or more processors, such as processors on storage nodes and processors in non-volatile solid-state storages in some embodiments. In an action 602, a remote procedure call is sent from a top of rack switch (or other type or location of a switch) to a storage cluster. In some embodiments, the top of rack switch performs parsing of the remote procedure call, and sends the remote procedure call directly to the storage cluster according to the parsing (and thus action 606 would not be needed). In other embodiments a storage cluster or storage node may determine an inode number for data referenced in the remote procedure call, and then determine which storage node is the appropriate destination for the remote procedure call.

In an action 604, the remote procedure call is received at a storage node. It should be appreciated that if the receiving storage node is the correct storage node for the remote procedure call, in accordance with the authority of the storage node, the receiving storage node need not perform action 606. In an action 606, the remote procedure call is forwarded to a destination storage node i.e., to the storage node which is the appropriate destination for the remote procedure call. The remote procedure call cache belonging to this (destination) storage node is checked to see if there is already a result from executing the remote procedure call, in a decision action 608. This would be the case if a remote procedure call was previously executed, but the client sent a duplicate remote procedure call, e.g., if the result got lost en route or was excessively delayed. If the answer is yes, there is a result from executing the remote procedure call, flow branches to the action 620, in order to respond to the remote procedure call with the result. If the answer is no, there is no result yet, flow continues to the action 610 in order to write to the remote procedure call cache and then service the remote procedure call.

In the action 610, the remote procedure call, or information relating to the remote procedure call, is written to a remote procedure call cache. This is the remote procedure call cache belonging to the destination storage node. The method proceeds to action 612, where the remote procedure call cache is mirrored to one or more mirrored remote procedure call caches. The mirrored remote procedure call cache is on another one of the storage nodes, as described above with reference to FIGS. 4 and 5. The level of redundancy for the remote procedure call may be set according to policies for a storage node in some embodiments.

In a decision action 614, it is determined if the mirrored remote procedure call cache is unreachable. If the answer is no, the mirrored remote procedure call cache is reachable, flow branches to the action 618, in which the remote procedure call is serviced. In some embodiments the remote procedure call is serviced after the level of redundancy for the remote procedure call is achieved. After servicing the remote procedure call, the storage node or solid-state storage responds to the remote procedure call with the result, in an action 620. The flow then proceeds back to the action 602, for the next remote procedure call and repeats as described above. If the answer to the decision action 614 is yes, the mirrored remote procedure call cache is unreachable, flow branches to the action 616. In the action 616, a replacement mirror, i.e., mirrored remote procedure call cache, is determined. In some embodiments, a prerequisite to action 616 is to determine that the level of redundancy for the remote procedure call has been achieved. Determination of a replacement remote procedure call cache can be performed via application of a table, as described above in some embodiments. After the action 616, flow continues back to the action 612, in order to mirror the remote procedure call cache to the newly determined replacement mirror and then service the remote procedure call in the action 618.

Figure 7:
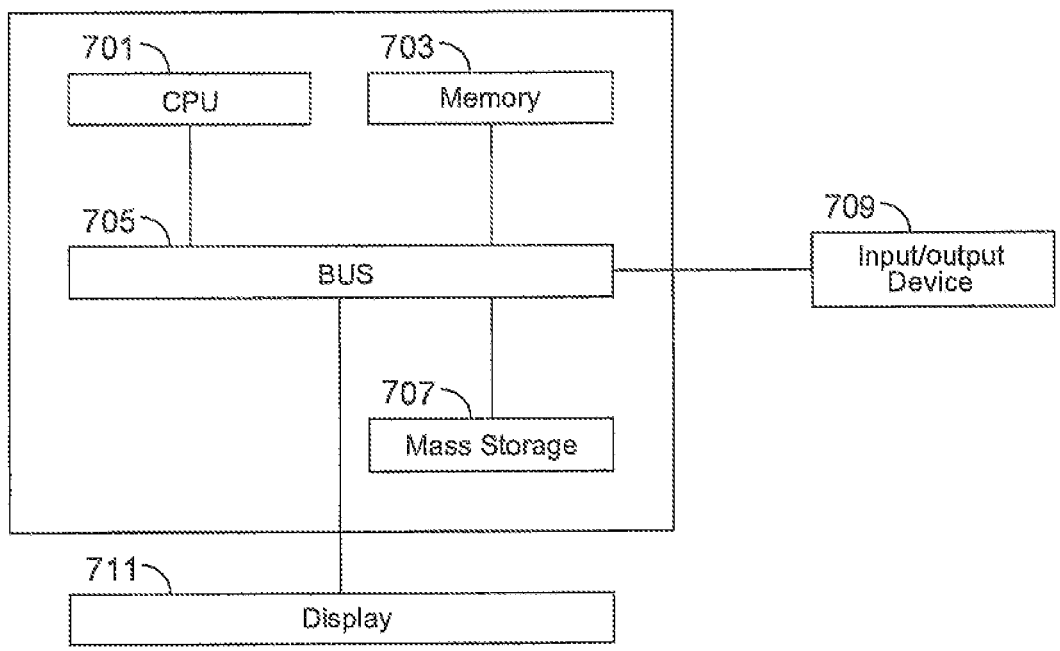
FIG. 7 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device which may implement the embodiments described herein. The computing device of FIG. 7 may be used to perform embodiments of the functionality for a storage node or a non-volatile solid-state storage in accordance with some embodiments. The computing device includes a central processing unit (CPU) 701, which is coupled through a bus 705 to a memory 703, and mass storage device 707. Mass storage device 707 represents a persistent data storage device such as a disc drive, which may be local or remote in some embodiments. The mass storage device 707 could implement a backup storage, in some embodiments. Memory 703 may include read only memory, random access memory, etc. Applications resident on the computing device may be stored on or accessed via a computer readable medium such as memory 703 or mass storage device 707 in some embodiments. Applications may also be in the form of modulated electronic signals modulated accessed via a network modem or other network interface of the computing device. It should be appreciated that CPU 701 may be embodied in a general-purpose processor, a special purpose processor, or a specially programmed logic device in some embodiments.

Display 711 is in communication with CPU 701, memory 703, and mass storage device 707, through bus 705. Display 711 is configured to display any visualization tools or reports associated with the system described herein. Input/output device 709 is coupled to bus 705 in order to communicate information in command selections to CPU 701. It should be appreciated that data to and from external devices may be communicated through the input/output device 709. CPU 701 can be defined to execute the functionality described herein to enable the functionality described with reference to FIGS. 1-6. The code embodying this functionality may be stored within memory 703 or mass storage device 707 for execution by a processor such as CPU 701 in some embodiments. The operating system on the computing device may be MS-WINDOW™, UNIX™, LINUX™, iOS™, CentOS™, Android™, Redhat Linux™, z/OS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A storage system, comprising:
   a plurality of storage nodes configurable to cooperate as a storage cluster, each storage node of the plurality of storage nodes having solid-state storage;
   a first remote procedure call cache in a first one of the plurality of storage nodes, the first remote procedure call cache configurable to receive a remote procedure; and
   a second remote procedure call cache in a second one of the plurality of storage nodes, configurable to mirror the first remote procedure call cache, each of the plurality of storage nodes having an authority with exclusive rights for updating entities associated with the authority.

2. The storage system of claim 1, wherein the entities are units of data or metadata stored within the cluster.

3. The storage system of claim 1, wherein the plurality of storage nodes support a plurality of filesystems.

4. The storage system of claim 1, wherein the remote procedure call cache is configurable to store, as metadata relating to a remote procedure call, a transaction identifier, a client identifier, and a result.

5. The storage system of claim 4, wherein the transaction identifier is utilized to locate a primary authority for the remote procedure call.

6. The storage system of claim 1, further comprising:
   each of the plurality of storage nodes having a table, configured to indicate a primary authority, a first backup authority, and a second backup authority, wherein the remote procedure call cache corresponds to the primary authority.

7. The storage system of claim 1, further comprising:
   each of the plurality of storage nodes configurable to determine whether a mirrored remote procedure call cache is unreachable and to mirror the remote procedure call cache to a replacement mirrored remote procedure call cache responsive to the remote procedure call cache being unreachable.

8. A method for fault-tolerant operation of remote procedure call caches in a storage system, comprising:
   replicating a first remote procedure call cache in a storage node of the storage system into a differing storage node of the storage system; and
   determining the storage node of the storage system is unreachable; and
   identifying the differing storage node having the replicated remote procedure call cache, responsive to the determining.

9. The method of claim 8, further comprising:
   routing the first remote procedure call from a switch to the storage node, based on an inode number.

10. The method of claim 8, wherein:
   the first remote procedure call relates to a file with a first inode version, corresponding to a first filesystem, and is received at a first Internet Protocol (IP) address associated with the first filesystem, wherein a second remote procedure call relates to a file with a second inode version, corresponding to a second filesystem, and is received at a second IP address associated with the second filesystem.

11. The method of claim 8, further comprising:
   determining, at the differing one of the plurality of storage nodes, that the storage node has an authority for data relating to the first remote procedure call in order to forward the first remote procedure call to storage node.

12. The method of claim 8, further comprising:
establishing a plurality of mirrored remote procedure call caches each associated with a backup authority relating to a corresponding range of user data, wherein the first remote procedure call cache is associated with a first authority relating to a first range of user data and a second remote procedure call cache is associated with a second authority relating to a second range of user data.

13. The method of claim 8, further comprising:
each of a plurality of storage nodes of the storage system has a table configurable to indicate a primary authority, a first backup authority, and a second backup authority, wherein the remote procedure call cache corresponds to the primary authority.

14. The method of claim 8, further comprising:
determining which one of a plurality of storage nodes is a destination for the first remote procedure call, based on an inode number for data relative to the first remote procedure call in order to route the first remote procedure call to the storage node.

15. A tangible, non-transitory, computer-readable media having instructions thereupon which, when executed by one or more processors, cause the one or more processors to perform a method comprising:
replicating a first remote procedure call cache in a storage node of the storage system into a differing storage node of the storage system; and
determining the storage node of the storage system is unreachable; and
identifying the differing storage node having the replicated remote procedure call cache, responsive to the determining.

16. The computer-readable media of claim 15, further comprising:
routing the first remote procedure call from a switch to the storage node, based on an inode number.

17. The computer-readable media of claim 15, wherein:
the first remote procedure call relates to a file with a first inode version, corresponding to a first filesystem, and is received at a first Internet Protocol (IP) address associated with the first filesystem, wherein a second remote procedure call relates to a file with a second inode version, corresponding to a second filesystem, and is received at a second IP address associated with the second filesystem.

18. The computer-readable media of claim 15, further comprising:
determining, at the differing one of the plurality of storage nodes, that the storage node has an authority for data relating to the first remote procedure call in order to forward the first remote procedure call to storage node.

19. The computer-readable media of claim 15, further comprising:
establishing a plurality of mirrored remote procedure call caches each associated with a backup authority relating to a corresponding range of user data, wherein the first remote procedure call cache is associated with a first authority relating to a first range of user data and a second remote procedure call cache is associated with a second authority relating to a second range of user data.

20. The computer-readable media of claim 15, further comprising:
each of a plurality of storage nodes of the storage system has a table configurable to indicate a primary authority, a first backup authority, and a second backup authority, wherein the remote procedure call cache corresponds to the primary authority.

\* \* \* \* \*